E. G. HOFFMANN, DEC'D.
A. W. KIDDLE & A. M. BECKER, EXECUTORS.
CAGE FOR BALL BEARINGS.
APPLICATION FILED FEB. 10, 1911.
1,103,965.
Patented July 21, 1914.
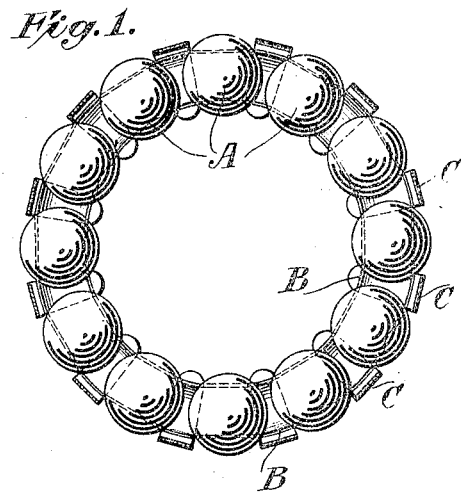
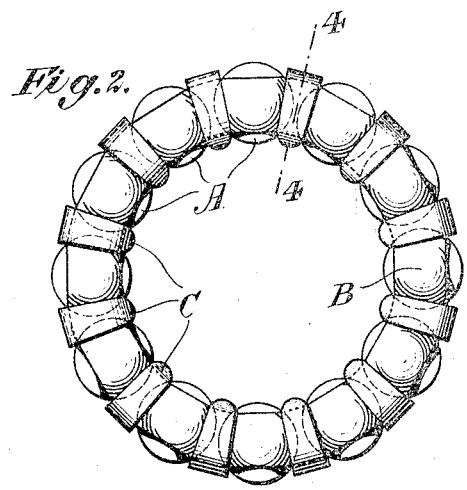
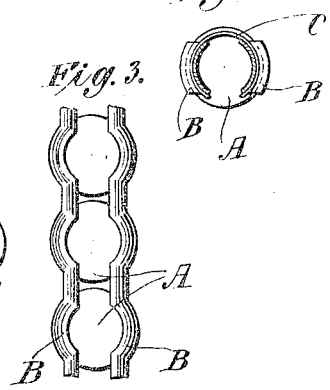
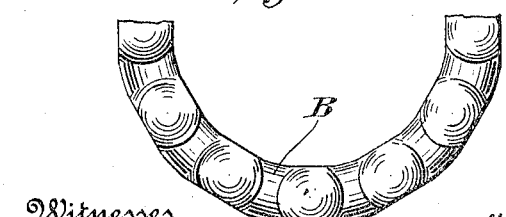
Witnesses
Inventor:
Ernst G. Hoffmann Dec'd.
Alfred W. Kiddle and Amelie M. Becker
By their Attorneys   Executors

UNITED STATES PATENT OFFICE.

ERNST GUSTAV HOFFMANN, DECEASED, LATE OF NEW ROCHELLE, NEW YORK, BY ALFRED W. KIDDLE, OF NEW YORK, N. Y., AND AMALIE MATHILDE BECKER, OF FRANKFORT-ON-THE-MAIN, GERMANY, EXECUTORS.

CAGE FOR BALL-BEARINGS.

1,103,965.

Specification of Letters Patent. Patented July 21, 1914.

Application filed February 10, 1911. Serial No. 607,730.

*To all whom it may concern:*

Be it known that we, ALFRED WATTS KIDDLE, a resident of the borough of Manhattan of the city of New York, State of New York, and AMALIE MATHILDE BECKER, a resident of the city of Frankfort-on-the-Main, Germany, (formerly AMALIE MATHILDE BAUMANN, of the city of New Rochelle, county of Westchester, and State of New York,) the executors named in the last will and testament of ERNST GUSTAV HOFFMANN, deceased, late a resident of the city of New Rochelle aforesaid, respectfully represent that the said ERNST GUSTAV HOFFMANN did make certain new and useful Improvements in Cages for Ball-Bearings, of which the following is a specification, reference being had to the accompanying drawings, forming a part hereof.

The object of the invention is to provide a cage for ball bearings which retains the balls in place by ball retaining or spacing members which are so arranged as to minimize the friction between the retaining means and the balls and which are also cheap, effective and simple to make.

In said drawings which illustrate a simple and practical embodiment of the invention: Figure 1 is a transverse sectional view of the cage with the balls in place therein. Fig. 2 is an end elevation of the cage with the balls also in place. Fig. 3 is a partial side view of the bearing, the clip shown in Fig. 7 having been removed. Fig. 4 is a cross sectional view taken on the line 4—4 of Fig. 2. Fig. 5 is a view of the retaining ring or spacer which is utilized at the end of the cage. Fig. 6 is an enlarged section of the retaining ring or spacer taken on a plane which passes through the center of one of the balls. Fig. 7 shows in detail the spring clip which is utilized to hold the retaining rings or spacers in place and Fig. 8 is a view of the blank from which the clip is made.

The same reference character is used to designate the same part wherever it appears in the specification and also the drawing.

A ball bearing member is shown in Figs. 1, 2 and 3 having balls A and a cage comprising the ball retaining rings or spacers B and clips C which serve as connecting means for holding the retaining members in place.

Each of the retaining rings comprises cup-shaped portions for receiving the balls and the ball engaging surfaces of said cup-shaped portions are curved so as to conform to the surface of a sphere whose radius is greater than the radius of the balls which are seated therein as it can be clearly seen from an inspection of Fig. 6. As it is well known that the balls in a ball bearing rotate on an axis of their own it will be apparent that if retaining members engage the balls at the extremity of the axis there will be less friction than if the retaining member or members engage the balls at the circumference which travels at the fastest rate of speed. Now from said figure it will be seen that the retaining rings engage the balls at the extremities of the axis of rotation thereof and therefore the frictional resistance between the balls and the rings is reduced to a minimum.

The retaining rings are stamped from flat sheet metal so that the thickness of the metal in all the parts is substantially the same. They are also curved in cross section along all lines radiating from the center of the bearing, in order to impart rigidity thereto and as the rings are formed of sheet metal it will be apparent that there is produced a ball retaining member which is comparatively light, strong, stiff and cheap to manufacture.

The spring clip shown in Fig. 7 for holding the retaining rings in place can also be formed by cutting from sheet metal a blank having the form shown in Fig. 8 and then by bending said blank to the curve shown in Fig. 7.

In order to assemble the bearing member all that is necessary is to take one of the retaining rings and place the balls in the cup-shaped portions thereof then place on the top of the balls the other retaining rings and subsequently spring the clips over the neck portions or those portions of the retaining rings which is between the cup-shaped portions. It will be observed that the spring clips therefore serve a double function, namely, that of a yieldable connecting means for holding the retaining rings or members in place and also as a means which readily permits the assembling and disassembling of the parts.

It is obvious that various forms and modifications may be made without departing from the spirit and scope of my invention.

I claim as my invention:

In a device of the class described, a series of balls, pressed sheet metal annular rings on opposite sides of the balls and bent C-shaped ring holding clips, the balls being held in place between and by the two annular rings, each ring having a series of cup-shaped ball-receiving portions whose inner surfaces conform to the surface of a sphere having a greater radius than the radius of the balls which engage or are engaged by said surfaces, and also having neck portions that are curved in cross section between the cup-shaped ball-receiving portions, the C-shaped clips engaging the curved neck portion to hold the rings in place on opposite sides of the balls.

This specification signed in the city of New York, in the State of New York, by ALFRED W. KIDDLE, and in the city of Leipzig, Empire of Germany, by AMALIE MATHILDE BECKER.

ALFRED W. KIDDLE,
AMALIE MATHILDE BECKER,

*Executors of the Estate of Ernst Gustav Hoffmann, deceased.*

Witnesses for Alfred W. Kiddle:
G. McGRANN,
EDWIN A. PACKARD.

Witnesses for Amalie Mathilde Becker:
RUDOLPH FRICKE,
DORIS KRAHL.